(12) United States Patent
Kawato et al.

(10) Patent No.: US 12,056,781 B2
(45) Date of Patent: Aug. 6, 2024

(54) DOCUMENT PROCESSING PROGRAM AND INFORMATION PROCESSING APPARATUS

(71) Applicant: LegalForce Inc., Tokyo (JP)

(72) Inventors: Takashi Kawato, Tokyo (JP); Ruka Funaki, Tokyo (JP)

(73) Assignee: LEGALON TECHNOLOGIES, INC., Tokyo (JP)

( * ) Notice: Subject to any disclaimer, the term of this patent is extended or adjusted under 35 U.S.C. 154(b) by 213 days.

(21) Appl. No.: 17/525,763

(22) Filed: Nov. 12, 2021

(65) Prior Publication Data

US 2022/0076363 A1 Mar. 10, 2022

Related U.S. Application Data

(63) Continuation of application No. PCT/JP2019/041439, filed on Oct. 23, 2019.

(30) Foreign Application Priority Data

May 14, 2019 (JP) ................................ 2019-091069

(51) Int. Cl.
*G06Q 30/00* (2023.01)
*G06F 16/9038* (2019.01)
(Continued)

(52) U.S. Cl.
CPC ......... *G06Q 50/18* (2013.01); *G06F 16/9038* (2019.01); *G06F 16/93* (2019.01)

(58) Field of Classification Search
None
See application file for complete search history.

(56) References Cited

U.S. PATENT DOCUMENTS

2005/0198559 A1* 9/2005 Fujiwara ............... G06F 16/951
715/229
2006/0085220 A1* 4/2006 Frank .................. G06Q 50/184
705/310
(Continued)

FOREIGN PATENT DOCUMENTS

JP H10254863 A 9/1998
JP 2007279883 A 10/2007
(Continued)

OTHER PUBLICATIONS

International Search Report in PCT/JP2019/041439, mailed Dec. 17, 2019. 7pp.
(Continued)

*Primary Examiner* — Matthew T Sittner
(74) *Attorney, Agent, or Firm* — HAUPTMAN HAM, LLP

(57) ABSTRACT

A document processing apparatus and a program that separate versions of an input contract document based on an amendment history; specify a template document from the versions of the input contract document; search a database containing past contract documents that share identical or a similar template document with the input document, wherein each of the past contract documents includes versions of the past contract documents; extract one or more versions of the past contract documents that contain contents similar to the input contract document from the past contract documents that share the identical or similar template document with the input document; and present a first amendment candidate of the input contract document based on contents of a first version of the extracted past contract document in the extracted one or more versions of the past contract documents, together with the input contract document.

19 Claims, 10 Drawing Sheets

(51) Int. Cl.
    *G06F 16/93*     (2019.01)
    *G06Q 50/18*     (2012.01)

(56) References Cited

U.S. PATENT DOCUMENTS

| | | | | |
|---|---|---|---|---|
| 2008/0231879 | A1* | 9/2008 | Takemoto | G06F 16/93 |
| | | | | 358/1.13 |
| 2013/0191405 | A1* | 7/2013 | Li | G06Q 10/107 |
| | | | | 707/755 |
| 2015/0379343 | A1* | 12/2015 | Powell | G06F 18/251 |
| | | | | 382/229 |
| 2016/0188700 | A1* | 6/2016 | Kleinschnitz, Jr. | G06F 16/285 |
| | | | | 707/738 |
| 2016/0253303 | A1* | 9/2016 | Pennington | G06F 40/174 |
| | | | | 715/226 |
| 2017/0006064 | A1* | 1/2017 | Agarwal | H04L 9/3263 |
| 2018/0314680 | A1* | 11/2018 | Dorai | G06F 40/166 |

FOREIGN PATENT DOCUMENTS

| | | | |
|---|---|---|---|
| JP | 201092227 | A | 4/2010 |
| JP | 2012173824 | A | 9/2012 |
| JP | 201836835 | A | 3/2018 |

OTHER PUBLICATIONS

Written Opinion in PCT/JP2019/041439, mailed Dec. 17, 2019. 11pp.

\* cited by examiner

FIG. 3A
FIG. 3B
FIG. 3C

DOCUMENT PROCESSING PROGRAM AND INFORMATION PROCESSING APPARATUS

CROSS-REFERENCE TO RELATED APPLICATIONS

The present application is a bypass continuation application based on and claims the benefit of priority from the prior Japanese patent application No. 2019-091069 filed on May 14, 2019, and PCT Application No. PCT/JP2019/041439 filed Oct. 23, 2019, the entire contents of which are incorporated herein by reference.

TECHNICAL FIELD

The embodiments relate to a document processing program and an information processing apparatus.

BACKGROUND ART

As a conventional technique, there has been proposed an information processing apparatus that presents a risk of modified contract terms and countermeasures when the contract document is modified (see, for example, Patent Literature 1).

The information processing apparatus disclosed in Patent Literature 1 generates template contract document divided data obtained by dividing template contract document data for each provision and modified contract document divided data obtained by dividing the modified contract document data for each provision, generates contrast data indicating a correspondence relationship between the respective provisions of both contract documents and a difference portion between the provisions in the correspondence relationship based on the template contract document divided data and the modified contract document divided data, extracts examination item data related to the difference portion from the examination item data defined for each provision of the template contract document based on the contrast data, and outputs the contrast data and the extracted examination item data, thereby presenting a risk and a countermeasure of the modified contract terms.

CITATION LIST

Patent Literature

Patent Literature 1: JP 2010-92227 A

SUMMARY OF INVENTION

Technical Problem

The information processing apparatus of Patent Literature 1 described above presents a risk and a countermeasure of modified contract terms when the contract document is modified, but extracting as modification is a difference from the template contract document, and examination item data is registered in advance as a risk matter. In general, the modification of a contract document is performed by exchanging with the counterparty, and what should be noted is not a difference from the template but what modification difference should be made with respect to the modification of the counterparty, and the contents of the item to be noted also changes according to the contents of a series of modifications, so that matters to be noted are often case-by-case. That is, the information processing apparatus of Patent Literature 1 described above presents a difference from the template and the examination item for the difference, but does not present the contents to be presented next correspondingly to the modification of the counterparty or present the matters to be noted corresponding to the series of modifications, and it cannot be said that the information processing apparatus can necessarily make a proposal suitable for the immediately preceding modification.

In addition, there is a problem that when a contract document edited by the counterparty is received, a step of searching for which of the own contract documents the contract document corresponds to is increased. In particular, when the contents or title (such as a file name) of the contract document is modified, it is necessary to compare the contents of the contract documents, and the procedure increases.

An object of the embodiments are to provide a document processing program and an information processing apparatus corresponding to a series of modifications of a contract document.

Solution to Problem

In order to achieve the above object, one aspect of the embodiments provide the following document processing program and information processing apparatus.

An aspect of embodiments includes a non-transitory computer-readable medium storing a program including instructions that, when executed by a processor, causes an information processing apparatus connected to a document processing apparatus through a communication interface, to: separate a plurality of versions of an input contract document based on an amendment history of the input contract document; specify a template document on which the input contract document is based, from the separated plurality of versions of the input contract document; search a database containing various past contract documents for past contract documents that are based on an identical or a similar template document to that of the input document, wherein each of the past contract documents includes a plurality of versions of the past contract documents based on an amendment history and contains one or more of versions of the past contract documents that are identical or similar to the template document; extract one or more versions of the past contract documents that contain contents similar to the input contract document from the past contract documents that are based on the identical or similar template document to that of the input document; and present a first amendment candidate of the input contract document based on contents of a first version of the extracted past contract document in the extracted one or more versions of the past contract documents that contain contents similar to the input contract document, together with the input contract document.

Yet another aspect of embodiments includes the non-transitory computer-readable medium described above, wherein the program further causes the information processing apparatus to: divide the input contract document per provision and divide the first version of the extracted past contract document per provision, and present the first amendment candidate in the divided first version of the extracted past contract document based on a corresponding provision of the divided input contract document.

Yet another aspect of embodiments includes the non-transitory computer-readable medium described above, wherein the program further causes the information processing apparatus to: present a second amendment candidate of the input contract document based on contents of a second version of the extracted past contract document in the extracted one or more versions of the past contract documents that contains contents similar to the input contract document, together with or alternative to the first amendment candidate.

Yet another aspect of embodiments includes the non-transitory computer-readable medium described above, wherein the program further information processing apparatus to: present the first amendment candidate with an indication of a portion amended from contents of a version of the extracted past contract document immediately before the first version of the extracted past contract document.

Yet another aspect of embodiments includes the non-transitory computer-readable medium described above, wherein the program further causes the information processing apparatus to: present the first amendment candidate together with a comment tied to the first amendment candidate.

Yet Another aspect of embodiments includes the non-transitory computer-readable medium described above, wherein the past contract documents that are based on the similar template document to that of the input document comprise contract documents containing a plurality of common provisions, sentences, phrases or terms with the input contract document, or contract documents containing commonly shared extracted feature amounts with the input contract document.

Another aspect of embodiments includes a non-transitory computer-readable medium storing a program including instructions that, when executed by a processor, causes an information processing apparatus connected to a document processing apparatus through a communication interface, to: separate a plurality of versions of an input contract document based on an amendment history of the input contract document, extract a related contract document that includes contents identical or similar to any or all of the plurality of versions of the input contract document; and present the related contract document linked to the input contract document as a link contract document candidate.

Yet another aspect of embodiments includes the non-transitory computer-readable medium described above, wherein the program further causes the information processing apparatus to: extract attribute information from the input contract document, and extract the related contract document containing related attribute information that is an item identical or similar to at least one item of the attribute information of the input contract document.

Another aspect of embodiments includes a non-transitory computer-readable medium storing a program including instructions that, when executed by a processor, causes an information processing apparatus connected to a document processing apparatus through a communication interface, to: extract attribute information from an input contract document; extract a related contract document including related attribute information that is an item identical or similar to at least one item of the attribute information of the input contract document; and present the related contract document linked to the input contract document as a link contract document candidate.

Another aspect of embodiments includes an information processing apparatus comprising: a communication device configured to communicate with a document processing apparatus through a communication interface; a processor; and a storage device configured to store a program including instructions that, when executed by the processor, causes the document processing apparatus to: separate a plurality of versions of an input contract document based on an amendment history of the input contract document; specify a template document on which the input contract document is based, from the separated plurality of versions of the input contract document; search a database containing various past contract documents for past contract documents that are based on an identical or similar template document to that of the input document, wherein each of the past contract documents includes a plurality of versions of the past contract documents based on an amendment history and contains one or more of versions of the past contract documents that are identical or similar to the template document; extract one or more versions of the past contract documents that contain contents similar to the input contract document from the past contract documents that are based on the identical or similar template document to that of the input document; and present a first amendment candidate of the input contract document based on contents of a first version of the extracted past contract document in the extracted one or more versions of the past contract documents that contain contents similar to the input contract document.

Another aspect of embodiments includes an information processing apparatus comprising: a communication device configured to communicate with a document processing apparatus through a communication interface; a processor; and a storage device configured to store a program including instructions that, when executed by the processor, causes the document processing apparatus to: separate a plurality of versions of an input contract document based on an amendment history of the input contract document; extract a related contract document that includes contents identical or similar to any or all of the plurality of versions of the input contract document; and present the related contract document linked to the input contract document as a link contract document candidate.

Yet Another aspect of embodiments includes an information processing apparatus comprising: a communication device configured to communicate with a document processing apparatus through a communication interface; a processor; and a storage device configured to store a program including instructions that, when executed by the processor, causes the document processing apparatus to: extract attribute information from an input contract document; extract a related contract document including related attribute information that is an item identical or similar to at least one item of the attribute information of the input contract document; and present the related contract document linked to the input contract document as a link contract document candidate.

Another aspect of embodiments includes a method for processing documents comprising: separating a plurality of versions of an input contract document based on an amendment history of the input contract document; specifying a template document on which the input contract document is based, from the separated plurality of versions of the input contract document; searching a database containing various past contract documents for past contract documents that are based on an identical or similar template document to that of the input document, wherein each of the past contract documents includes a plurality of versions of the past contract documents based on an amendment history and contains one or more of versions of the past contract documents that are identical or similar to the template document; extracting one or more versions of the past contract documents that contain contents similar to the input contract document from the past contract documents that are based on the identical or similar to the template document to that of the input document; and presenting a first amendment candidate of the input contract document based on contents of a first version of the extracted past contract document in the extracted one or more versions of the past contract documents that contain contents similar to the input contract document, together with the input contract document.

Advantageous Effects of Invention

According to the aspects of the embodiments, it is possible to propose an amendment candidate suitable for a series of modifications of the contract document.

According to the aspect of the embodiments, for each provision of the input contract document, the corresponding provision of the similar contract document can be presented as an amendment candidate.

According to the aspect of the embodiments, a next version of a version similar in contents to the input contract document can be extracted as the similar contract document.

According to the aspect of the embodiments, the amendment candidate can be presented together with the change portion from the previous version.

According to the aspect of the embodiments, an amendment candidate can be presented together with the comment attached to the amendment candidate.

According to the aspect of the embodiments, it is possible to suppress an increase in the step of searching for which of the contract documents of the own company corresponds when the contract document edited by the counterparty is received.

According to the aspect of the embodiments, attribute information can be extracted from the input contract document, and a contract document including, as attribute information, an item identical or similar to any or all of the items of the attribute information of the input contract document can be extracted as the related contract document.

According to the aspect of the embodiments, it is possible to suppress an increase in the step of searching for which of the contract documents of the own company corresponds when a contract document edited by the counterparty is received.

BRIEF DESCRIPTION OF DRAWINGS

FIG. 3A is a schematic diagram for illustrating a contract document extraction operation of the document processing program.

FIG. 3B is a schematic diagram for illustrating a contract document extraction operation of the document processing program.

FIG. 3C is a schematic diagram for illustrating a contract document extraction operation of the document processing program.

DESCRIPTION OF EMBODIMENTS

First Embodiment (Configuration of information processing apparatus)

Figure 1:
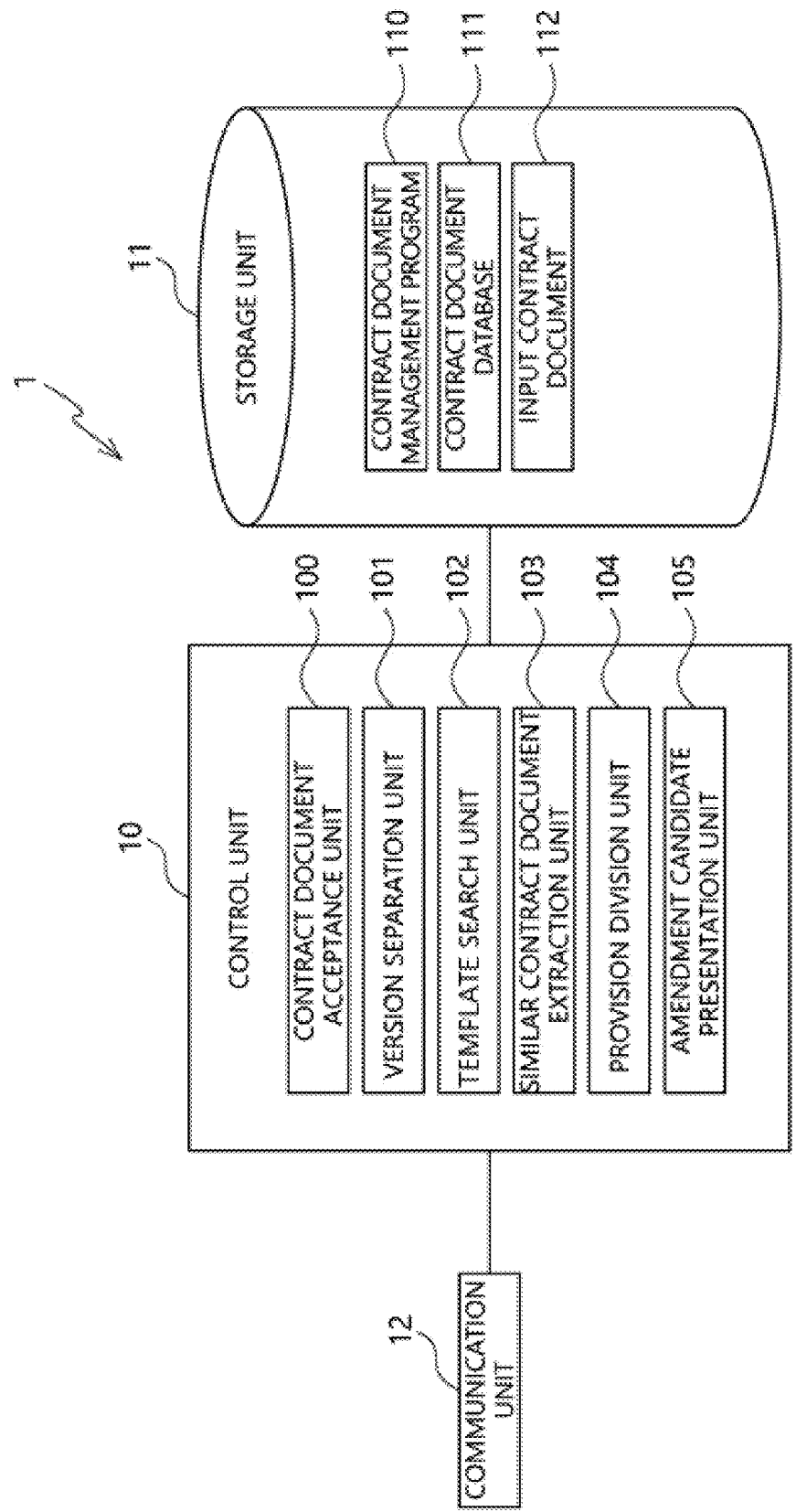
FIG. 1 is a block diagram showing a configuration example of an information processing apparatus according to a first embodiment.

FIG. 1 is a block diagram showing a configuration example of an information processing apparatus according to a first embodiment.

The information processing apparatus 1 includes a control unit 10 that includes a central processing unit (CPU) or the like, controls each unit, and executes various programs, a storage unit 11 that includes a storage medium such as a hard disk drive (HDD) or a flash memory and stores information, and a communication unit 12 that communicates with the outside via a network.

By executing a contract document management program 110 as a document processing program described below, the control unit 10 functions as a contract document acceptance unit 100, a version separation unit 101, a template search unit 102, a similar contract document extraction unit 103, a provision division unit 104, an amendment candidate presentation unit 105, and the like.

The contract document acceptance unit 100 accepts the input of the current version contract document and stores the current version contract document in the storage unit 11 as the input contract document 112.

The version separation unit 101 separates the past version contract document from the amendment history of the input contract document 112. In addition, the version separation unit 101 separates the past version contract document from the amendment history of the contract document in the contract document database 111. It should be noted that the contract document database 111 may be prepared by separating versions in advance. In addition, the "amendment history" will be described below (see illustration of FIG. 2).

The template search unit 102 extracts a contract document being a template from the past version contract document of the input contract document 112 separated by the version separation unit 101, and searches the contract document in the contract document database 111 having used the identical or similar template. It should be noted that here, the "template" is a template of a contract document into which a single or a plurality of provisions are input in advance according to the type of the contract document, and a style and/or a format thereof is designated. In addition, the "template" is not limited to a contract document prepared as a template in advance, and may be a contract document treated as a template as a result of an increase in the frequency of use.

The similar contract document extraction unit 103 extracts those similar in contents to the version of the input contract document 112 as a similar contract document from the version of the contract document in the contract document database 111 using the identical or similar template searched by the template search unit 102. In addition, the degree of similarity of the contents may be those with a large number of common provisions, sentences, phrases, terms, and the like, or those in which feature amounts are extracted and the feature amounts are similar to each other.

The provision division unit 104 divides the input contract document 112 and the contract document in the contract document database 111 into provision units. It should be noted that the contract document in the contract document database 111 may be prepared by dividing the contract document into provision units in advance.

The amendment candidate presentation unit 105 presents an amendment candidate of the input contract document 112 based on the similar contract document extracted by the similar contract document extraction unit 103. A specific method for presenting an amendment candidate will be described below.

The storage unit 11 stores a contract document management program 110 that operates the control unit 10 as each unit 100 to 105 described above, a contract document database 111, an input contract document 112, and the like.

(Operation of Information Processing Apparatus)

Next, the action of the first embodiment will be described separately for (1) the basic contract operation, (2) the contract document extraction operation, and (3) the contract document presentation operation.

(1) Basic Contract Operation

Figure 2:
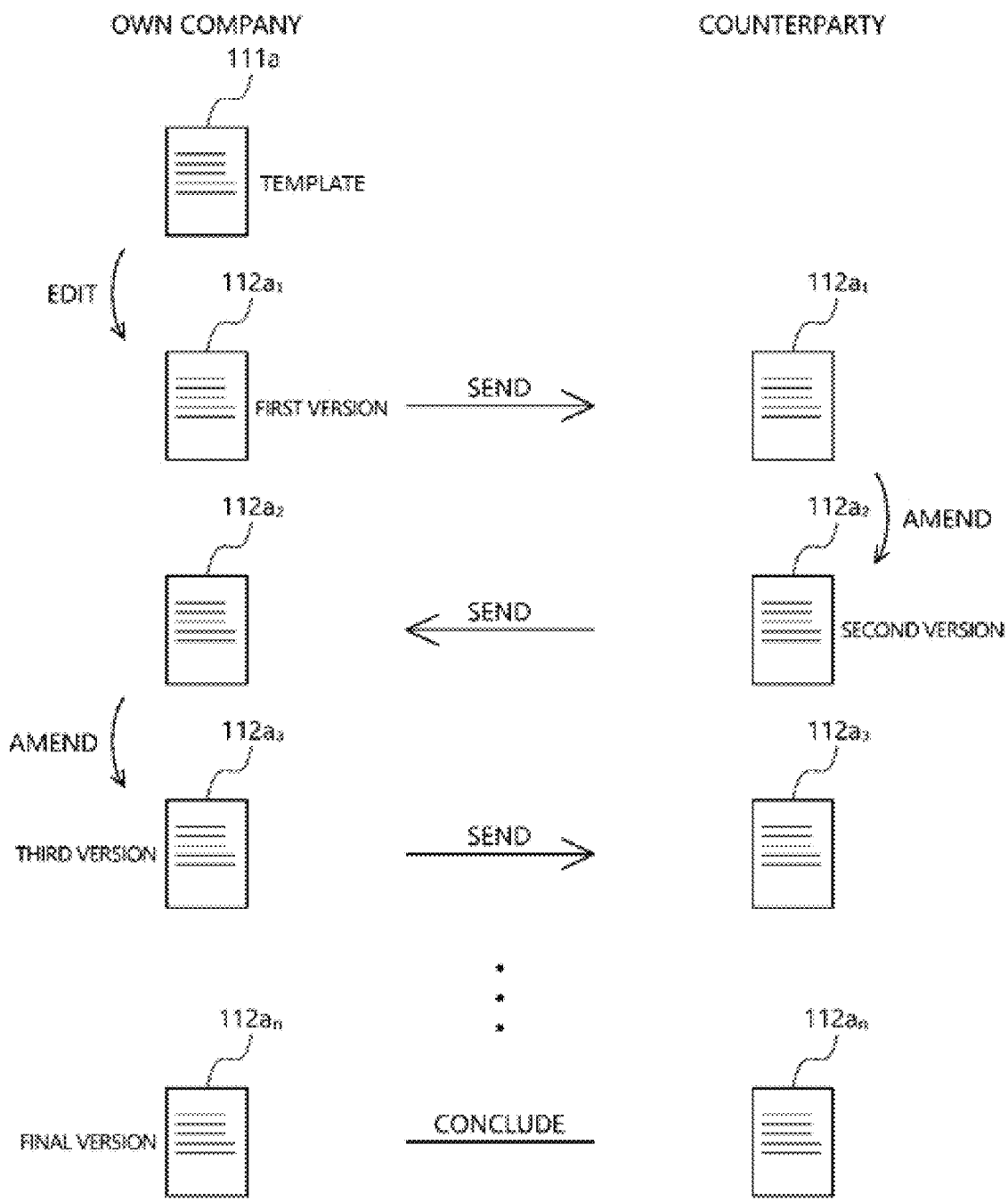
FIG. 2 is a schematic diagram for illustrating a basic contract operation.

FIG. 2 is a schematic diagram for illustrating a basic contract operation.

In general, before the own company and the counterparty conclude a contract, one side of the own company or the counterparty edits a template 111a to prepare a first version contract document $112a_1$, the other side of the own company or the counterparty repeatedly checks and amends the contents of the contract document a plurality of times to prepare the second and subsequent version contract documents $112a_2$, $112a_3$, and the like, and then the final version contract document $112a_n$ is prepared. Preparing a new version may be referred to as modification. In addition, hereinafter, the combination of the contents added and deleted by the editing and the amendment and the added and deleted time series is referred to as an "amendment history", and is information accompanying document information of the contract document. In addition, it is preferable that the "amendment history" further includes a comment corresponding to the added or deleted contents and/or an identifier of the user edited or amended. It should be noted that the separation between versions may be at a timing when the user having edited or amended a version is replaced, or may be provided for each temporal group, and various modifications are conceivable.

(2) Contract Document Extraction Operation

Figure 6:
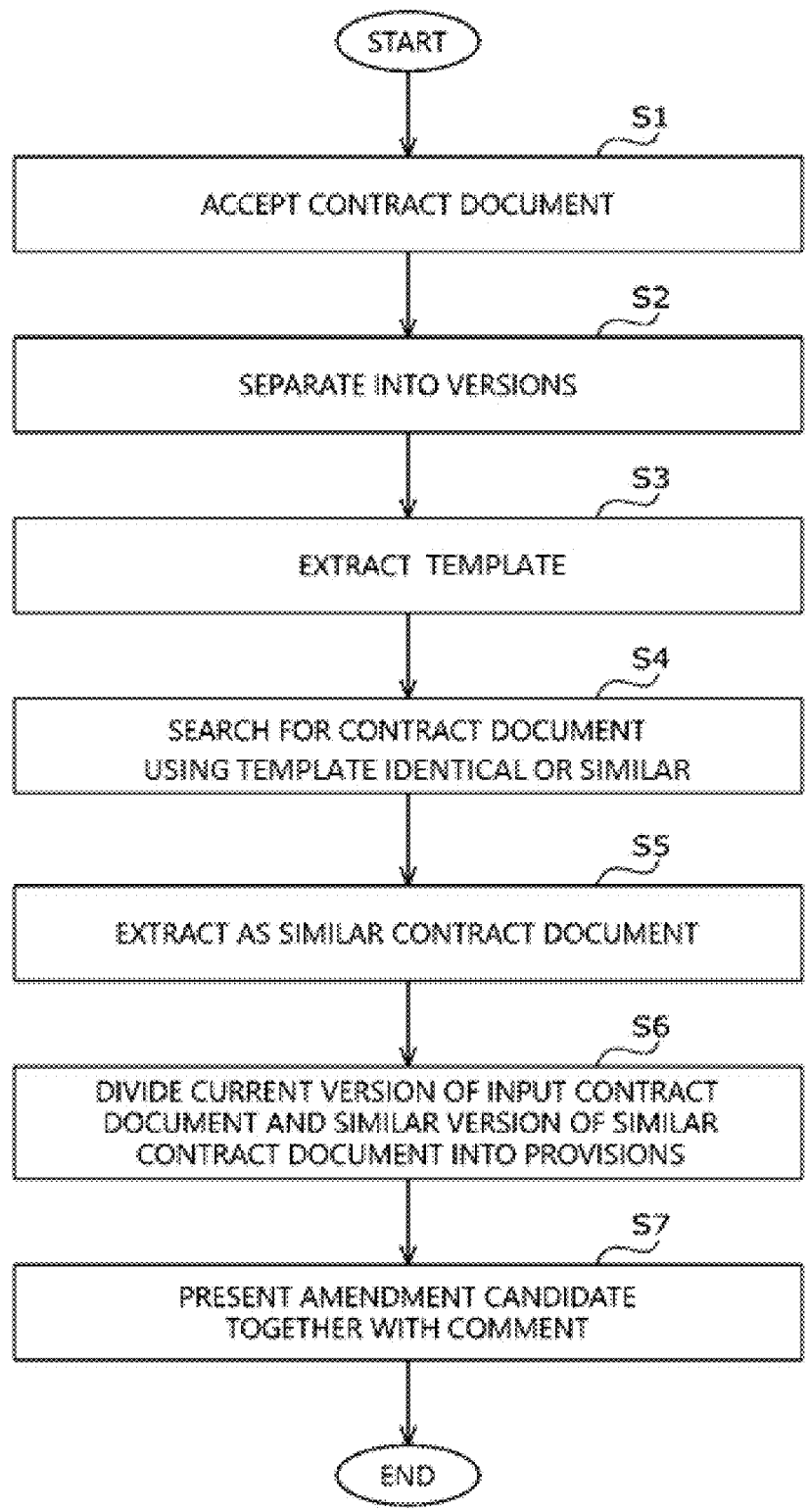
FIG. 6 is a flowchart showing an operation example of the document processing program.

FIG. 6 is a flowchart showing an operation example of the document processing program. In addition, FIGS. 3A to 3C and FIG. 4 are schematic diagrams for illustrating a contract document extraction operation of the document processing program. It should be noted that the user on the own company side and the user on the counterparty side described in FIG. 2 can be replaced as appropriate, but in order to simplify the description, hereinafter, description will be made on the operation when the user on the own company side receives the edited contract document from the counterparty side, checks the contents, and amends the contract document to send the contract document to the user on the counterparty side.

First, when receiving the contract document from the user on the counterparty side, the user on the own company side inputs the contract document to a terminal (not shown) connected to the information processing apparatus 1 via the communication unit 12.

As shown in FIG. 3A, the contract document acceptance unit 100 of the information processing apparatus 1 accepts the input of the contract document (S1) and stores the contract document in the storage unit 11 as an input contract document $112b_i$. It should be noted that the input contract document $112b_i$ is assumed to be the i-th version contract document.

Next, as shown in FIG. 3B, the version separation unit 101 of the information processing apparatus 1 generates and separates the past version contract documents $112b_1$ to $112b_i$ including the contract document 111b being a template from the amendment history being the information accompanying the input contract document $112b_i$ (S2).

In addition, as shown in FIG. 3C, at the same time or at a different timing, the version separation unit 101 separates the past version contract documents 111b, $1121_1$ to $1121_j$ from the amendment history of the contract document 112l in the contract document database 111, separates the past version contract documents 111c, $112m_1$ to $112m_j$ from the amendment history of the contract document 112m, and separates the past version contract documents 111b, $112n_1$ to $112n_j$ from the amendment history of the contract document 112n. It should be noted that the versions of the contract documents 112l, 112m, and 112n are all j-th versions, but may be different from each other.

Next, the template search unit 102 extracts the contract document 111b being a template from the past version contract document of the input contract document $112b_i$ separated by the version separation unit 101 (S3), and searches the contract document in the contract document database 111 using the common template (S4). In the example shown in FIG. 3C, the templates of the contract documents 112l and 112n have the contract document 111b in common. It should be noted that the template search unit 102 is assumed to search not only completely the identical template but also, as common templates, contract documents that use templates similar in a certain range. In addition, the contract document being a template does not necessarily need to be the first version, and when similar contract documents exist between different contract documents, they may be treated as a template to each other.

Next, the similar contract document extraction unit 103 extracts, from the contract documents $1121_1$ to $1121_j$ and $112n_1$ to $112n_j$; being a plurality of versions of the contract documents 112l and 112n in the contract document database 111 using the identical or similar template searched by the template search unit 102, a contract document of a version close in the degree of similarity to the i-th version being the current version of the input contract document $112b_i$, here, the i-th version contract documents $1121_i$ and $112n_i$, as similar contract documents (S5). It should be noted that the identical version is not extracted as a similar contract document, but a version similar in the contents of the contract document is extracted as the similar contract document. It should be noted that in the next step, the contract document is divided into provision units. However, the contract document may be first divided into provision units, and each of the versions including provisions having contents similar in provision units may be extracted as a similar contract document.

Next, the provision division unit 104 divides the input contract document $112b_i$ and the contract documents $1121_j$ and $112n_i$ into provision units (S6). It should be noted that the contract document in the contract document database 111 may be prepared by dividing the contract document into provision units in advance.

Figure 4:
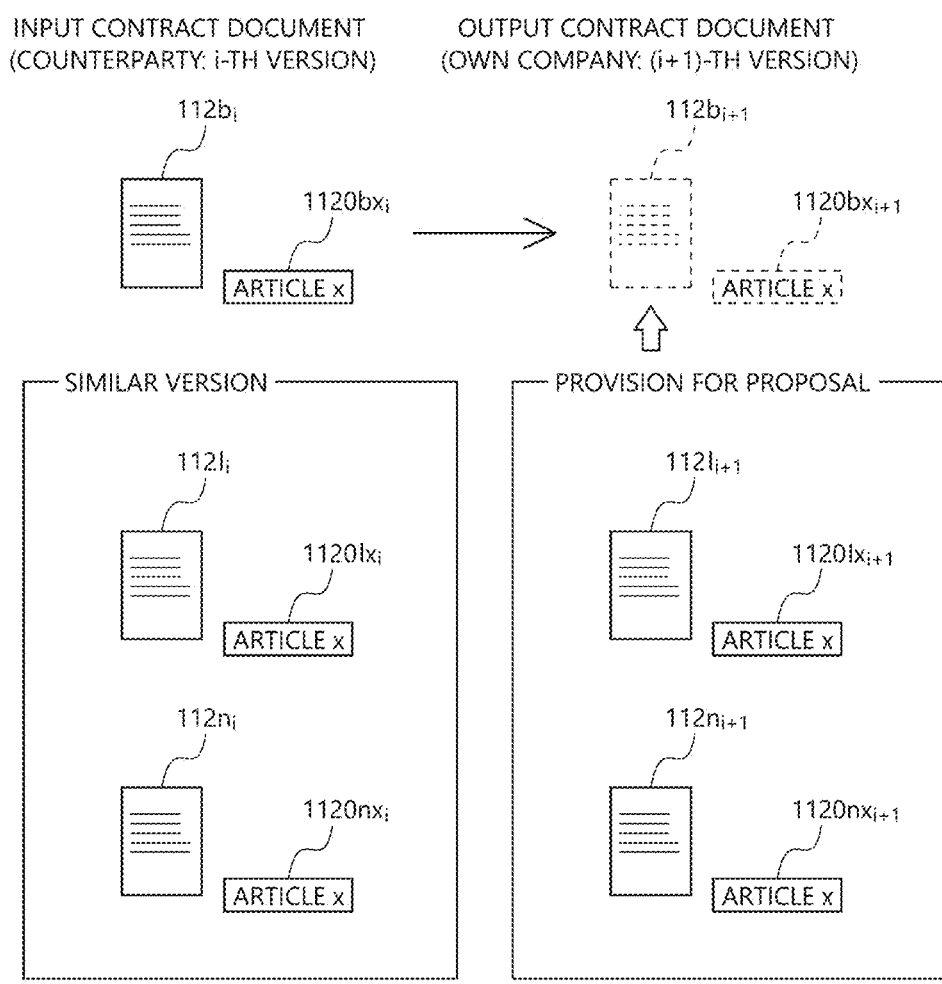
FIG. 4 is a schematic diagram for illustrating a contract document extraction operation of the document processing program.

At this point, as shown in FIG. 4, the provision similar to the provision $1120bx_i$ of the Article x of the input contract document $112b_i$ is the provision $1120lx_i$ of the Article x of the similar contract document $1121_j$ and the provision $1120lx_i$ of the Article x of the similar contract document $1121_i$. It should be noted that although any one of the contract documents describes Article x, it is essential that the contents correspond to each other, and the provision numbers may be different.

(3) Contract Document Presentation Operation

Next, the amendment candidate presentation unit 105 presents the amendment candidates of the input contract document $112b_i$ using the contents of the similar contract documents $1121_i$ and $112n_i$ extracted by the similar contract document extraction unit 103. As shown in FIG. 4, what should be presented as the amendment candidate of the input contract document $112b_i$ is the i+1 th version as the following version and the contents to be described as the contract document on the own company side. Therefore, the $1120lx_{i+1}$ and $1120nx_{i+1}$ being the Article x of the similar contract documents $1121_{i+1}$ and $112n_{i+1}$ being the i+1 th version are assumed to be the provision for proposal.

Next, the amendment candidate presentation unit 105 presents the provision for proposal selected by the above series of operations together with the amendment candidate and the corresponding comment (S7).

Figure 5:
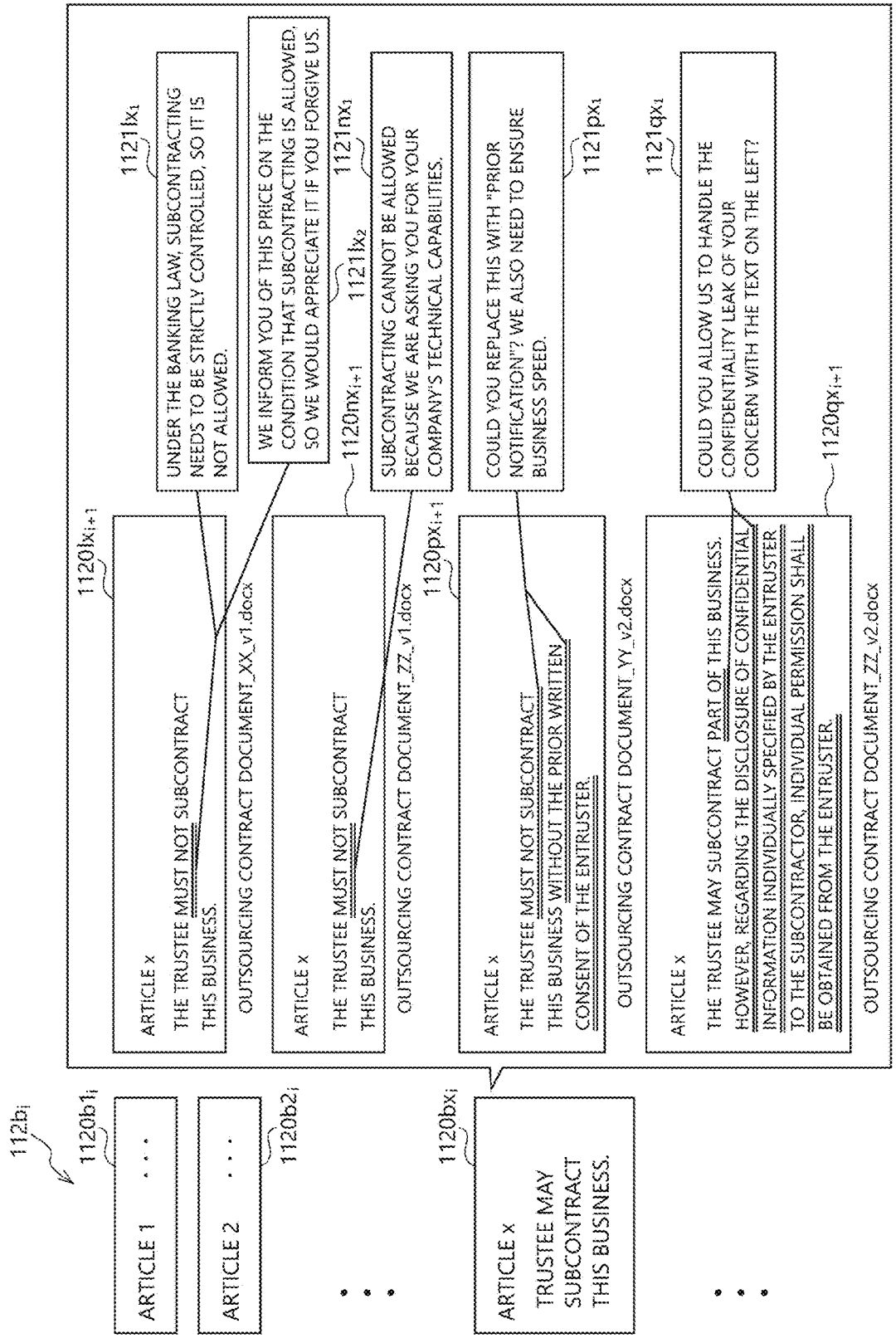
FIG. 5 is a schematic diagram for illustrating a contract document presentation operation of the document processing program.

FIG. 5 is a schematic diagram for illustrating a contract document presentation operation of the document processing program.

Each of the provisions $1120b1_i$, $1120b2_i$ ... $1120bx_i$ of the input contract document $112b_i$ is displayed with a provision for proposal, an amendment candidate, and a corresponding comment. For example, as shown in FIG. 5, the provision $1120bx_i$ of the Article x is displayed with a provision for proposal $1120lx_{i+1}$ (underlined portion is an amendment portion) and comments $1121lx_1$ and $1121lx_2$, a provision for proposal $1120nx_{i+1}$ (underlined portion is an amendment portion) and comments $1121nx_1$ and $1121nx_2$, a provision for proposal $1120px_{i+1}$ (underlined portion is an amendment portion) and comments $1121px_1$ and $1121px_2$, and a provision for proposal $1120qx_{i+1}$ (underlined portion is an amendment portion) and comments $1121qx_1$ and $1121qx_2$.

The display contents displayed by the above operation is displayed on the display unit of the terminal. The user on the own company side checks the display contents on the display unit of the terminal, selects a desired amendment candidate while referring to the comment, and sets the amendment candidate as the provision after modification, or edits the contents of the provision on the user's own while referring to the amendment candidate.

Effects of First Embodiment

According to the first embodiment described above, since the input contract document 112 is separated into versions based on the amendment history, the original template is specified, another contract document prepared from the same or similar template is specified, and among the contract documents, the amendment candidate is proposed from a version close in contents to the input contract document 112 and the next version, it is possible to cope with a series of modifications of the contract document.

Second Embodiment (Configuration of Information Processing Apparatus)

Figure 7:
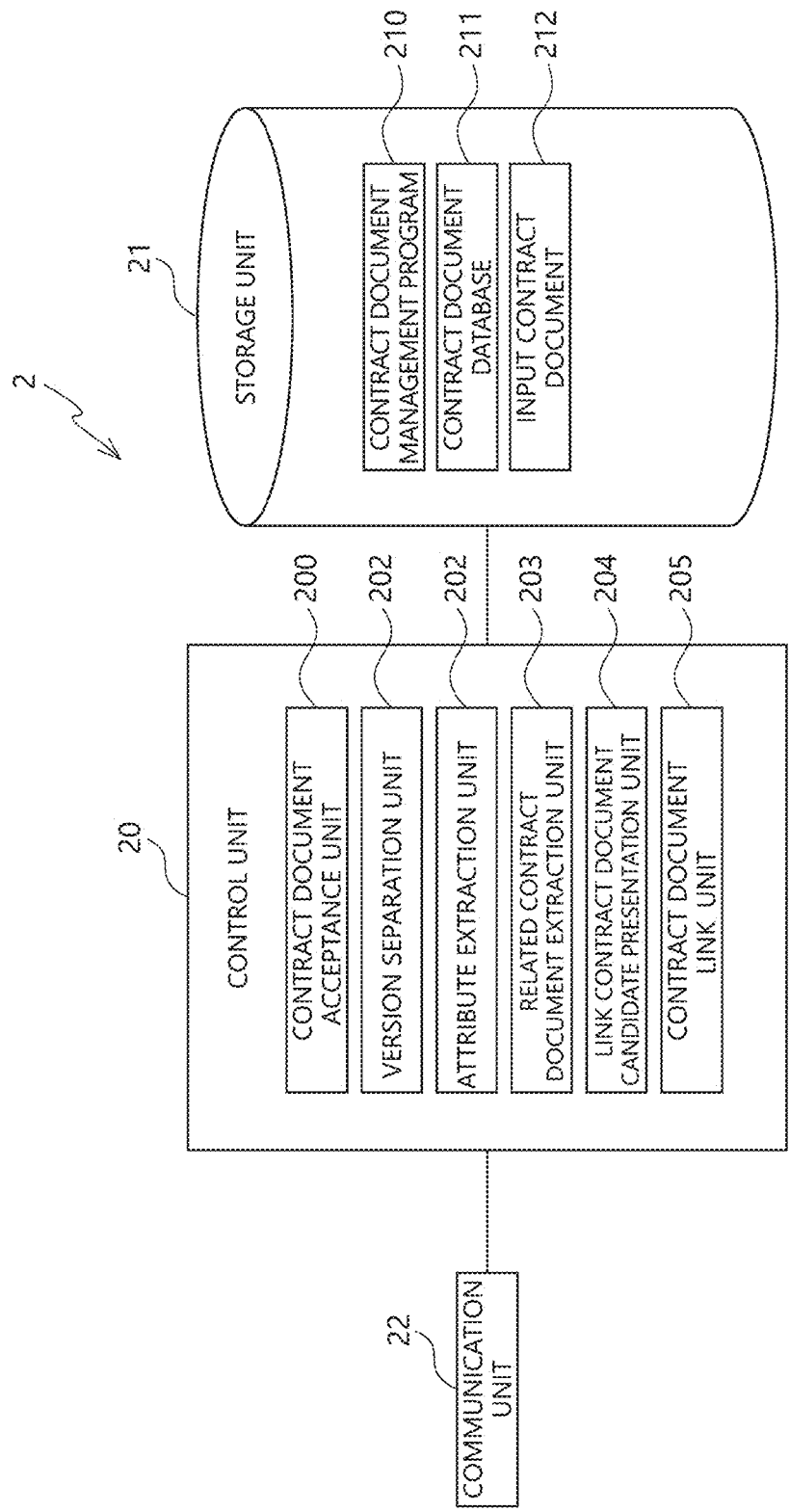
FIG. 7 is a block diagram showing a configuration example of an information processing apparatus according to a second embodiment.

FIG. 7 is a block diagram showing a configuration example of an information processing apparatus according to a second embodiment.

The information processing apparatus 2 includes: a control unit 20 that includes a CPU and the like, controls each unit, and executes various programs; a storage unit 21 that includes a storage medium such as an HDD and a flash memory and stores information; and a communication unit 22 that communicates with the outside via a network.

By executing a contract document management program 210 as a document processing program described below, the control unit 20 functions as a contract document acceptance unit 200, a version separation unit 201, an attribute extraction unit 202, a related contract document extraction unit 203, a link contract document candidate presentation unit 204, a contract document link unit 205, and the like.

The contract document acceptance unit 200 accepts the input of the current version contract document and stores the current version contract document in the storage unit 21 as the input contract document 212.

The version separation unit 201 separates the past version contract document from the amendment history of the input contract document 212. In addition, the version separation unit 201 separates the past version contract document from the amendment history of the contract document in the contract document database 211. It should be noted that the contract document database 211 may be prepared by separating versions in advance.

The attribute extraction unit 202 extracts attribute information such as a contract document title, a party name, a file name, and a renewal date of the input contract document 212.

As an example of a method for extracting a related contract document, the related contract document extraction unit 203 extracts a contract document similar to the past version contract document of the input contract document 212 separated by the version separation unit 101 from the contract document database 211 as the related contract document. In addition, as another example of a method for extracting a related contract document, the related contract document extraction unit 203 extracts a contract document in which some or all of attribute information such as a contract document title, a party name, a file name, and a renewal date extracted by the attribute extraction unit 202 are the same or similar, from the contract document database 211 as the related contract document. It should be noted that regarding the renewal date, a contract document having a renewal date before the renewal date of the input contract document 212 may be used as a highly relevant one, or a contract document having a renewal date close to the renewal date of the input contract document 212 may be used as a highly relevant one.

The link contract document candidate presentation unit 204 display-processes the related contract document extracted by the related contract document extraction unit 203 as a candidate.

The contract document link unit 205 links a contract document selected, by an operation of a user or based on predetermined conditions, from the related contract document display-processed as a candidate by the link contract document candidate presentation unit 204 to the input contract document 212 as a past version contract document of the input contract document 212 to update the contents of the contract document database 211.

The storage unit 21 stores a contract document management program 210 that operates the control unit 20 as each of the unit 200 to 205 described above, a contract document database 211, an input contract document 212, and the like.
(Operation of Information Processing Apparatus)

Next, the action of the first embodiment will be described separately for (1) the basic contract operation, (2) the contract document extraction operation, and (3) the contract document presentation operation. It should be noted that "(1) the basic contract operation" is the same as that in the first embodiment and thus is omitted.

(2) Contract Document Extraction Operation

Figure 8A:
FIG. 8A is a schematic diagram for illustrating a contract document extraction operation of the document processing program.
Figure 8B:
FIG. 8B is a schematic diagram for illustrating a contract document extraction operation of the document processing program.
Figure 8C:
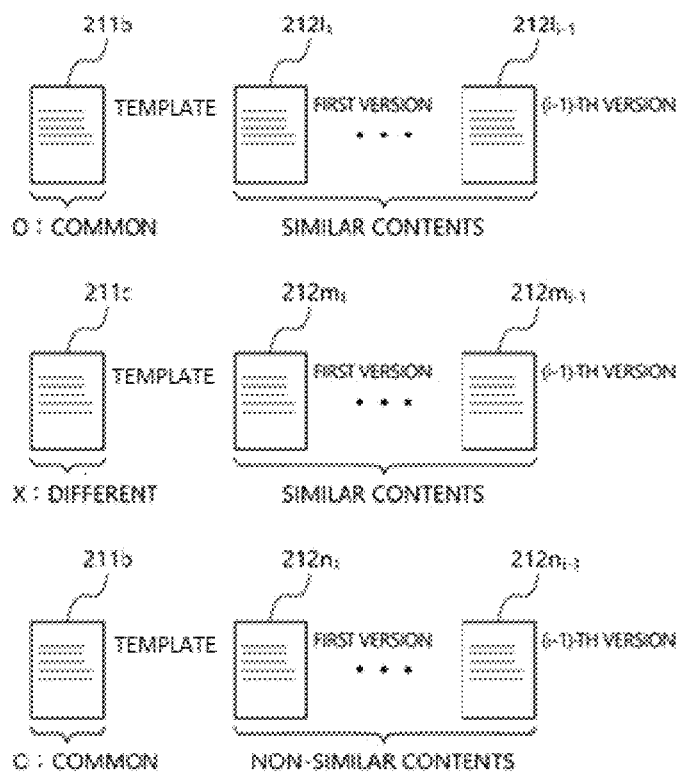
FIG. 8C is a schematic diagram for illustrating a contract document extraction operation of the document processing program.
Figure 10:
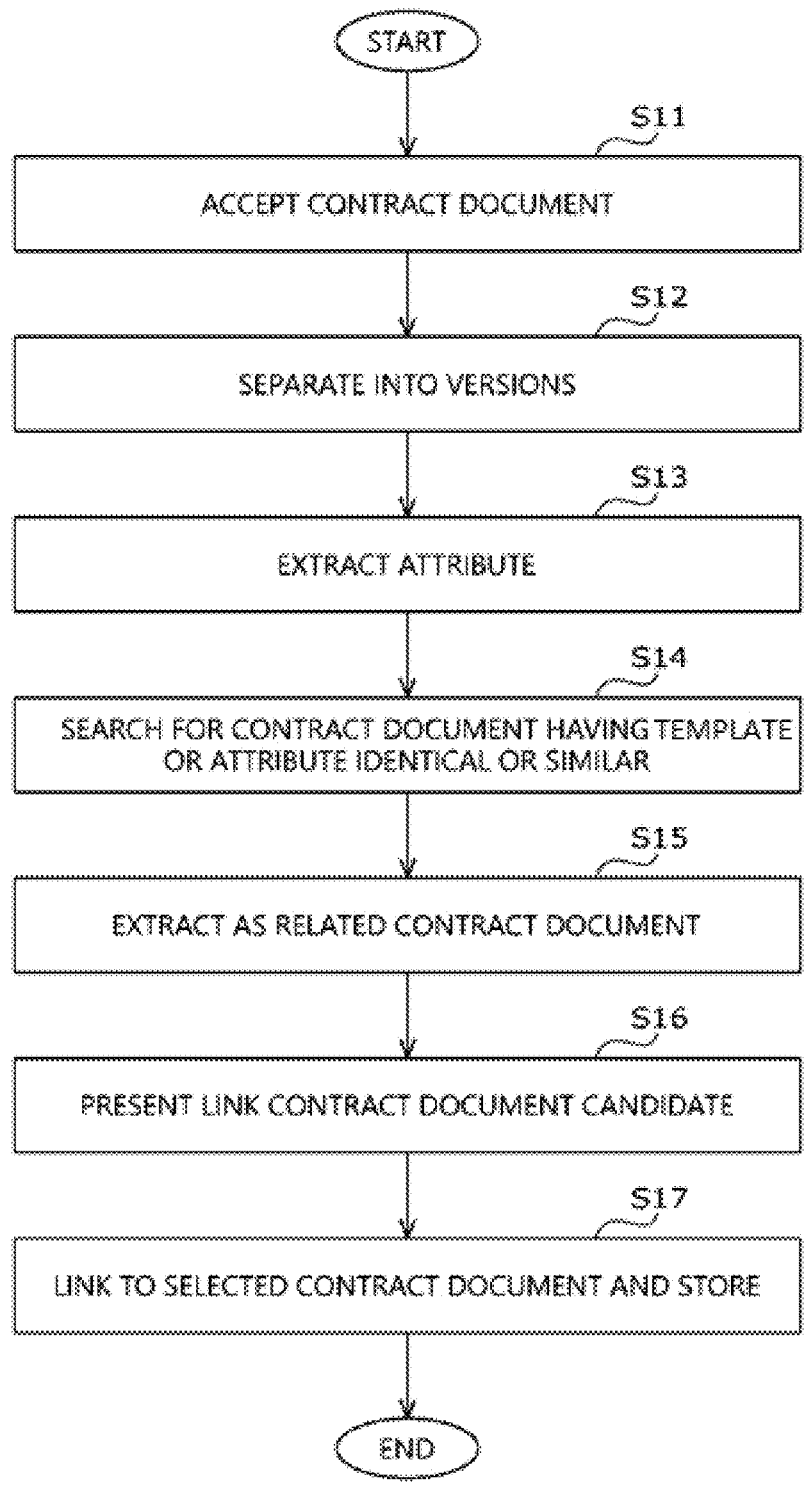
FIG. 10 is a flowchart showing an operation example of the document processing program.

FIG. 10 is a flowchart showing an operation example of the document processing program. In addition, FIGS. 8A to 8C are schematic diagrams for illustrating a contract document extraction operation of the document processing program. It should be noted that the user on the own company side and the user on the counterparty side described in FIG. 2 can be replaced as appropriate, but in order to simplify the description, hereinafter, description will be made on the operation when the user on the own company side receives the edited contract document from the counterparty side and links the contract document to the contract document in the contract document database 211.

First, when receiving the contract document from the user on the counterparty side, the user on the own company side inputs the contract document to a terminal (not shown) connected to the information processing apparatus 2 via the communication unit 22.

As shown in FIG. 8A, the contract document acceptance unit 200 of the information processing apparatus 2 accepts the input of the contract document (S11) and stores the contract document in the storage unit 21 as an input contract document $212b_i$. It should be noted that the input contract document $212b_i$ is assumed to be the i-th version contract document.

Next, as shown in FIG. 8B, the version separation unit 201 of the information processing apparatus 2 generates and separates the past version contract documents $212b_1$ to $212b_i$ including the contract document 211b being a template from the amendment history being the information accompanying the input contract document $212b_i$ (S12). It should be noted that when separation into versions cannot be made, the step may be ignored.

In addition, as shown in FIG. 8C, at the same time or at a different timing, the version separation unit 201 separates the past version contract documents 211b, 2121l to $212l_{i-1}$ from the amendment history of the contract document 212l in the contract document database 211, separates the past version contract documents 211c, $212m_1$ to $212m_{i-1}$ from the amendment history of the contract document 212m, and separates the past version contract documents 211b, $212n_i$ to $212n_{i-1}$ from the amendment history of the contract document 212n. It should be noted that the versions of the contract documents 212l, 212m, and 212n are all i−1 th versions, but may be different from each other.

Next, the related contract document extraction unit 203 extracts the contract document 211b being a template from the past version contract document of the input contract document $212b_i$ separated by the version separation unit 201, and searches the contract document in the contract document database 211 using the common template (S14).

In the example shown in FIG. 8C, since the templates of the contract documents 212l and 212n have 211b in common, the contract documents 212l and 212n are extracted as related contract documents (S15). It should be noted that the template search unit 102 is assumed to search not only completely the identical template but also, as common templates, contract documents that use templates similar in a certain range. In addition, the contract document being a template does not necessarily need to be the first version, and when similar contract documents exist between different contract documents, they may be treated as a template to each other.

In addition, the related contract document extraction unit 203 extracts the contract documents $211b_1$ to $211b_{i-1}$ other than the template from the past version contract document of the input contract document $212b_i$ separated by the version separation unit 201, and searches the contract document of the contract document database 211 having contract document versions similar in contents (S14). In the example shown in FIG. 8C, the contract documents of the contract documents 212l and 212m are similar in contents. It should be noted that not only contract documents completely similar in contract document versions but also contract documents having partially similar contract document versions are assumed to be extracted as related contract documents (S15).

In addition, the attribute extraction unit 202 extracts attribute information such as a contract document title, a party name, a file name, and a renewal date and time of the input contract document $212b_i$ (S13), and the related contract document extraction unit 203 extracts a contract document in which some or all of the contract document title, the party name, the file name, and the renewal date are the same or similar from the contract document database 211 as the related contract document (S15).

(3) Contract Document Presentation Operation

Next, the link contract document candidate presentation unit 204 presents the contract documents 212l and 212n being the related contract documents extracted by the related contract document extraction unit 203 as a link candidate of the input contract document $112b_i$ (S16).

Figure 9:
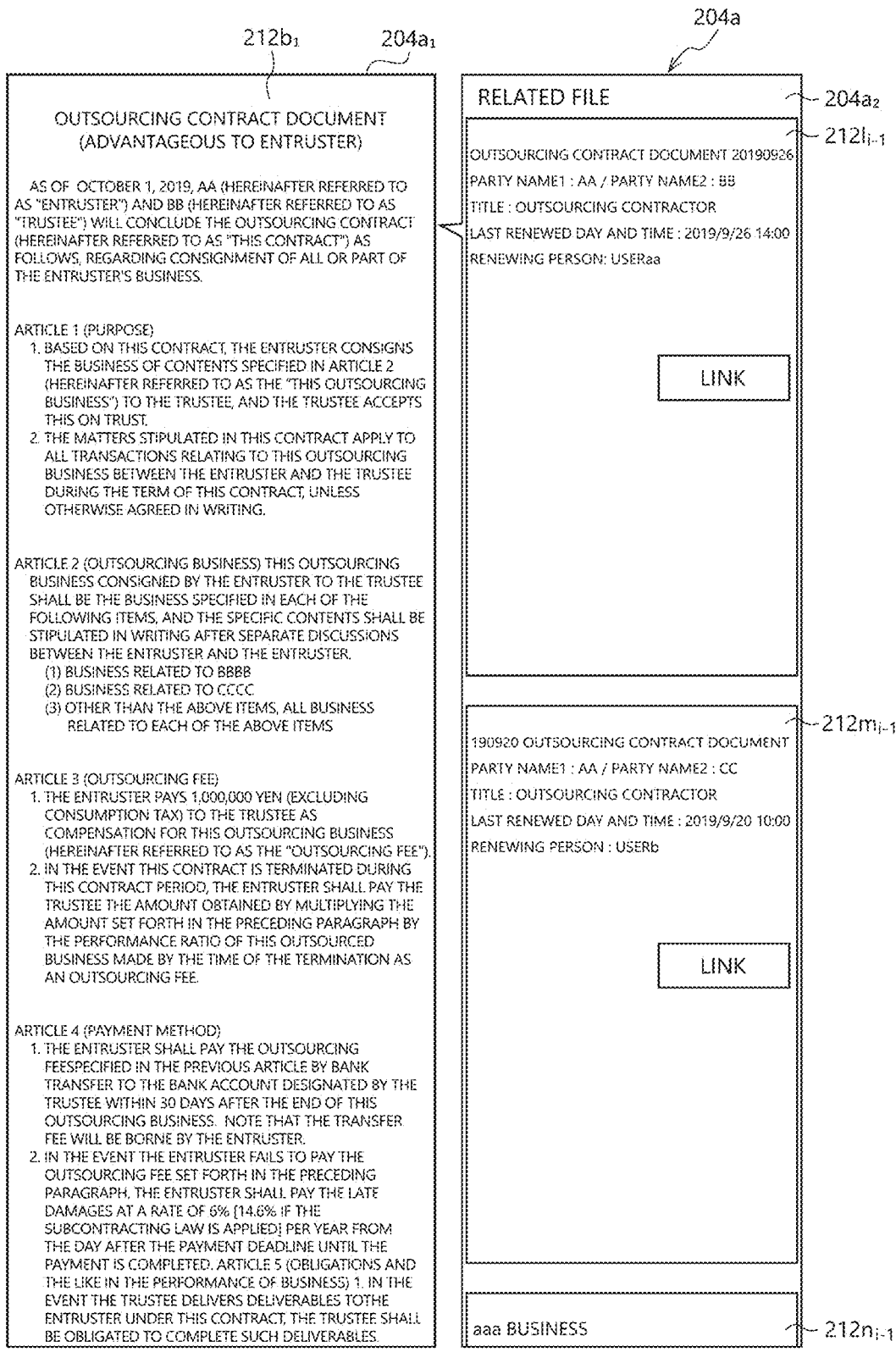
FIG. 9 is a schematic diagram for illustrating a contract document presentation operation of the document processing program.

FIG. 9 is a schematic diagram for illustrating a contract document presentation operation of the document processing program.

The link contract document candidate presentation unit 204 displays the input contract document $212b_i$ in the input contract document display field $204a_1$, and displays the contract documents 212l, 212m, and 212n extracted by the related contract document extraction unit 203 as the related contract documents in the related contract document display field $204a_2$. The display order of the contract documents 212l, 212m, and 212n in the related contract document display field $204a_2$ may be displayed in descending order of relevance or based on a predetermined rule. In addition, the file name, the party name, the contract document title, the renewal date and time, the renewing person, and the like are displayed as the contents of the contract documents 212l, 212m, and 212n, but the contents are not limited thereto, and the contents of the contract document may be further displayed. In addition, a "link" button is arranged in each of the contract documents displayed in the related contract document display field $204a_2$, and is linked with the input contract document $212b_i$ by operating the button.

The display contents described above are displayed on the display unit of the terminal. The user on the own company side checks the display contents on the display unit of the terminal, selects a desired link candidate, and links the selected link candidate to the input contract document $212b_i$.

The contract document link unit 205 of the information processing apparatus 2 links a contract document selected by an operation of a user from the related contract document display-processed as a candidate by the link contract document candidate presentation unit 204 to the input contract document 212 as a past version contract document of the input contract document 212 to update the contents of the contract document database 211. It should be noted that the related contract document display-processed as a candidate may be selected from predetermined conditions rather than manually.

Effects of Second Embodiment

According to the second embodiment described above, since a contract document identical or similar to the amendment history or the attribute information on the input contract document 212 is extracted from the contract document database 211 as a related contract document, it is possible to suppress an increase in the step of searching for which of the own contract documents the edited contract document corresponds to when a contract document edited by the counterparty is received. In particular, it is possible to make it unnecessary to compare the contents of the contract documents when the contents or the title (file name or the like) of the contract document is modified, and it is possible to suppress an increase in procedure.

OTHER EMBODIMENTS

It should be noted that the embodiments are not limited to the above embodiments, and various modifications can be made without departing from the gist of the embodiments. In the above embodiments, the function of each of the unit 100 to 105 of the control unit 10 and the function of each of the unit 200 to 205 of the control unit 20 are implemented by a program, but all or some of each of the unit may be implemented by hardware such as ASIC. In addition, the program used in the above embodiments can be provided by being stored in a recording medium such as a CD-ROM. In addition, replacement, deletion, addition, and the like of the above steps described in the above embodiments can be performed within the scope not changing the gist of the embodiments.

INDUSTRIAL APPLICABILITY

Provided are a document processing program and an information processing apparatus corresponding to a series of modifications of a contract document.

REFERENCE SIGNS LIST

1 information processing apparatus
10 control unit
11 storage unit
12 communication unit
100 contract document acceptance unit
101 version separation unit
102 template search unit
103 similar contract document extraction unit
104 provision division unit
105 amendment candidate presentation unit
110 contract document management program
111 contract document database
112 input contract document
200 contract document acceptance unit
201 version separation unit
202 attribute extraction unit
203 related contract document extraction unit
204 link contract document candidate presentation unit
205 contract document link unit
210 contract document management program
211 contract document database
212 input contract document

The invention claimed is:

1. A non-transitory computer-readable medium storing a program including instructions that, when executed by a processor, cause an information processing apparatus connected to a document processing apparatus through a communication interface, to:
   separate an input contract document into a plurality of versions of documents based on an amendment history of the input contract document;
   extract attribute information from the input contract document;
   extract a related contract document including related attribute information that is an item identical or similar to at least one item of the attribute information of the input contract document; present the related contract document linked to the input contract document as a link contract document candidate;
   display a link button together with a contract document in a related contract document display field; and
   link the related contract document with the input contract document through an operation of the link button.

2. The non-transitory computer-readable medium according to claim 1, wherein the instructions further cause the information processing apparatus to:
   extract, as the related contract document, a contract document including a version of document or versions of documents identical or similar to any or all of the plurality of versions of documents.

3. The non-transitory computer-readable medium according to claim 1, wherein
   the instructions further cause the information processing apparatus to extract one or more of a title, a party name, a file name, and a renewal date of the input contract document as the attribute information.

4. The non-transitory computer-readable medium according to claim 3, wherein
   the instructions further cause the information processing apparatus to extract a document with a renewal date close to the renewal date of the input contract document as highly relevant information, when extracting the renewal date as the attribute information.

5. The non-transitory computer-readable medium according to claim 1, wherein the instructions further cause the information processing apparatus to:
   specify a template document on which the input contract document is based, from the plurality of versions of documents;
   search a database containing various past contract documents for past contract documents that are based on an identical or a similar template document to that of the input document, wherein each of the past contract documents includes a plurality of versions of the past contract documents based on an amendment history and contains one or more of versions of the past contract documents that are identical or similar to the template document;

extract one or more versions of the past contract documents that contain contents similar to the input contract document from the past contract documents that are based on the identical or similar template document to that of the input document; and present a first amendment candidate of the input contract document based on contents of a first version of the extracted past contract document in the extracted one or more versions of the past contract documents that contain contents similar to the input contract document, together with the input contract document.

6. The non-transitory computer-readable medium according to claim 5, wherein the instructions further cause the information processing apparatus to:

divide the input contract document per provision and divide the first version of the extracted past contract document per provision, and present the first amendment candidate in the divided first version of the extracted past contract document based on a corresponding provision of the divided input contract document.

7. The non-transitory computer-readable medium according to claim 5, wherein the instructions further cause the information processing apparatus to present a second amendment candidate of the input contract document based on contents of a second version of the extracted past contract document in the extracted one or more versions of the past contract documents that contain contents similar to the input contract document, together with or alternative to the first amendment candidate.

8. The non-transitory computer-readable medium according to claim 5, wherein the instructions further cause the information processing apparatus to present the first amendment candidate with an indication of a portion amended from contents of a version of the extracted past contract document immediately before the first version of the extracted past contract document.

9. The non-transitory computer-readable medium according to claim 5, wherein the past contract documents that are based on the similar template document to that of the input document comprise contract documents containing a plurality of common provisions, sentences, phrases or terms with the input contract document, or contract documents containing commonly shared extracted feature amounts with the input contract document.

10. An information processing apparatus comprising:
a communication device configured to communicate with a document processing apparatus through a communication interface;
a processor; and
a non-transitory computer-readable medium storing a program including instructions that, when executed by the processor, cause the document processing apparatus to:
separate an input contract document into a plurality of versions of documents based on an amendment history of the input contract document;
extract attribute information from the input contract document;
extract a related contract document including related attribute information that is an item identical or similar to at least one item of the attribute information of the input contract document;

present the related contract document linked to the input contract document as a link contract document candidate;

display a link button together with a contract document in a related contract document display field; and link the related contract document with the input contract document through an operation of the link button.

11. A documents processing method executed by a computer and comprising:

separating a plurality of versions of an input contract document based on an amendment history of the input contract document;

extracting attribute information from an input contract document;

extracting a related contract document including related attribute information that is an item identical or similar to at least one item of the attribute information of the input contract document;

presenting the related contract document linked to the input contract document as a link contract document candidate;

displaying a link button together with a contract document in a related contract document display field; and linking the related contract document with the input contract document through an operation of the link button.

12. The documents processing method according to claim 11, further comprising:

separating the input contract document into a plurality of versions of documents based on an amendment history of the input contract document; and extracting as the related contract document, a contract document including a version of document or versions of documents identical or similar to any or all of the plurality of versions of documents.

13. The documents processing method according to claim 11, further comprising:

extracting one or more of a title, a party name, a file name, and a renewal date of the input contract document as the attribute information.

14. The documents processing method according to claim 13, further comprising:

extracting a document with a renewal date close to the renewal date of the input contract document as highly relevant information, when extracting the renewal date as the attribute information.

15. The documents processing method according to claim 11, further comprising:

separating the input contract document into a plurality of versions of documents based on the amendment history of the input contract document;

specifying a template document on which the input contract document is based, from the plurality of versions of documents;

searching a database containing various past contract documents for past contract documents that are based on an identical or a similar template document to that of the input document, wherein each of the past contract documents includes a plurality of versions of the past contract documents based on an amendment history and contains one or more of versions of the past contract documents that are identical or similar to the template document;

extracting one or more versions of the past contract documents that contain contents similar to the input contract document from the past contract documents that are based on the identical or similar template document to that of the input document; and presenting a first amendment candidate of the input contract document based on contents of a first version of the extracted past contract document in the extracted one or more versions of the past contract documents that contain contents similar to the input contract document, together with the input contract document.

16. The documents processing method according to claim 15, further comprising:

dividing the input contract document per provision and divide the first version of the extracted past contract document per provision; and presenting the first amendment candidate in the divided first version of the extracted past contract document based on a corresponding provision of the divided input contract document.

17. The documents processing method according to claim 15, further comprising:

presenting a second amendment candidate of the input contract document based on contents of a second version of the extracted past contract document in the extracted one or more versions of the past contract documents that contain contents similar to the input contract document, together with or alternative to the first amendment candidate.

18. The documents processing method according to claim 15, further comprising:

presenting the first amendment candidate with an indication of a portion amended from contents of a version of the extracted past contract document immediately before the first version of the extracted past contract document.

19. The documents processing method according to claim 15, further comprising:

the past contract documents that are based on the similar template document to that of the input document comprise contract documents containing a plurality of common provisions, sentences, phrases or terms with the input contract document, or contract documents containing commonly shared extracted feature amounts with the input contract document.

* * * * *